March 16, 1926.
E. T. MALLOY
CASTER
Filed June 27, 1922
1,576,923
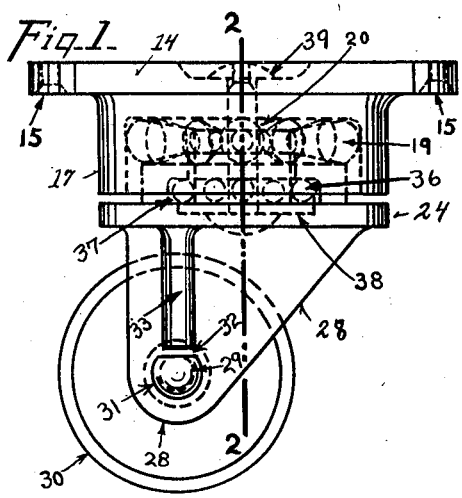
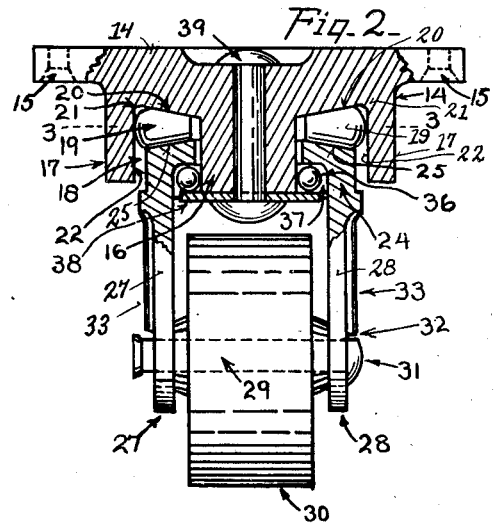
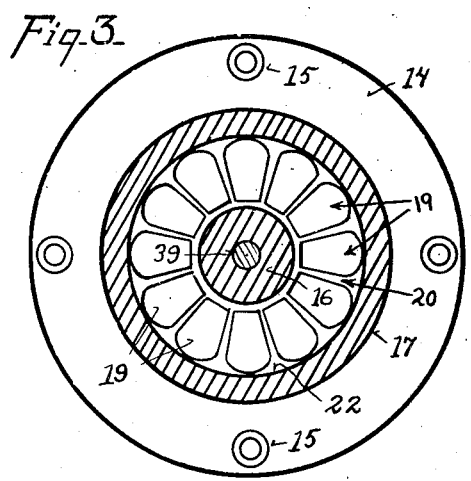
Inventor
Edward T. Malloy,
C. W. Miles,
Attorney Patented Mar. 16, 1926.

1,576,923

UNITED STATES PATENT OFFICE.

EDWARD T. MALLOY, OF HAMILTON, OHIO.

CASTER.

Application filed June 27, 1922. Serial No. 571,135.

*To all whom it may concern:*

Be it known that I, EDWARD T. MALLOY, a citizen of the United States, residing at Hamilton, in the county of Butler and State of Ohio, have invented certain new and useful Improvements in Casters, of which the following is a specification.

My invention relates to improvements in casters, one of its objects is to provide improved roller bearings adapted to be employed without cage members. Another object is to provide improved casters with roller bearings assembled with unfinished castings.

Another object is to provide improved casters having roller bearings presenting increased bearing surfaces whereby the caster members tend to wear uniformly and retain their original outlines instead of wearing grooves channels or depressions in the bearing faces. My invention also comprises certain details and relation of component members, all of which will be fully set forth in the description of the accompanying drawings in which:

Fig. 1 is a side elevation of a caster embodying my improvements.

Fig. 2 is a vertical section taken on line 2—2 of Fig. 1.

Fig. 3 is a horizontal section taken on line 3—3 of Fig. 2.

The accompanying drawings illustrate the preferred embodiment of my invention in which 14 represents a caster plate adapted to be secured to the article to be supported in any one of a variety of ways known to the art, as for instance by means of screws or bolts passed through the screw holes 15. The under side of the plate 14 is provided with a downwardly projecting stem 16 and a downwardly projecting rim 17 thereby forming an annular recess 18 between the rim 17 and the stem 16 to receive a series of independent conical rollers 19. The roof 20 of the recess 18 is inclined outwardly and upwardly at such angle as to cause the conical rollers to have a true rolling movement along the entire line of contact between the rollers and said inclined face 20. In order to produce smooth true castings of maximum strength a fillet or curve is provided at 21 where the inclined face 20 meets the inner wall 22 of the rim 17.

The caster frame or housing 24 is provided at its upper end with a downwardly and outwardly inclined face 25 a counterpart of the face 20 to engage the opposite faces of the conical rollers 19. The housing 24 is also provided with two downwardly projecting arms 27 and 28 which support opposite ends of an axle 29 on which axle is journaled a caster wheel 30. The axle 29 is preferably provided at one end with a head 31 having a portion thereof cut away at 32 opposite the end of one of the ribs 33 which extend downwardly along the outer faces of the respective arms 27 and 28. The engagement of the cut or squared face of the head 31 with the end of the rib 33 serves to prevent the axle 29 from rotating relative to the arms 27 and 28, thereby causing the roller to rotate upon its axle 29 where the maximum wearing surfaces are in engagement. The opposite end of the axle 29 may be perforated transversely to receive a cotter pin to hold the axle in place relative to arms 27 and 28 or if desired an other head may be formed on the axle 29 by riveting after the parts have been assembled.

The conical rollers 19 are assembled in the recess 18 as many as can be accommodated loosely therein, and without a cage or keeper for said rollers 19 other than the flange 17 and recess 18. The housing 24 is then adjusted to position and a series of balls 36 preferably assembled in a raceway 37, formed between the post 16 and the housing 24. A metal disk or washer 38 is then placed in position over the lower end of the post 16 and overhanging the raceway to confine the balls 36 in the raceway 27. A rivet, bolt, or capscrew 39 is then employed to hold the disk 37 rigidly in place upon the end of the post 16. The balls 36 provide a substantially frictionless lateral support or engagement between the housing 24 and post 16 to prevent lateral displacement of one of said parts relative to the other, while the main strain and weight is resisted by the more extended bearing surfaces of the conical rollers 19, without liability of creating sufficiently concentrated or localized strains so as to break down the structure either of the conical rollers or the faces over which they roll. The outer ends of the rollers 19 are rounded so as to contact with the face 22 of the caster plate only over a limited surface at substantially the axis of said respective rollers. One object of this is to enable the caster plates to be cast with fillets at 21 and without the rollers 19 making contact with said fillets. Another object is to receive and resist the natural radially outward end thrust of said rollers 19 when operating between the inclined faces 20 and 25 with a minimum of drag or frictional resistance.

The apparatus herein shown and described is capable of considerable modification without departing from the spirit of my invention.

What I claim is:—

A caster comprising a caster plate having a dowwardly projecting king-bolt member, an outwardly and upwardly inclined annular roller bearing face substantially concentric with said king-bolt member, and a downwardly projecting annular bearing flange outside of said inclined bearing face, a caster frame having a recess to receive said king-bolt member and an annular outwardly and downwardly inclined roller bearing face opposite the roller bearing face of said caster plate, said caster frame being provided with a caster wheel and with a radial thrust ball raceway opposite the lower end of said king-bolt member, a series of end thrust conical rollers having outwardly curved outer ends interposed between said inclined roller bearing faces with their outer ends in position to engage the inner face of said annular flange, a series of radial thrust balls located in said ball raceway, and means carried at the lower end of said king-bolt member to retain said balls in position in said ball raceway and to relatively hold said caster plate and caster frame in spaced relation.

In testimony whereof I have affixed my signature.

EDWARD T. MALLOY.